Sept. 19, 1967 M. W. BEARDSLEY 3,342,280
JET SHEET ENCLOSURE FOR COMPRESSED GASES
Filed April 4, 1957 2 Sheets-Sheet 1
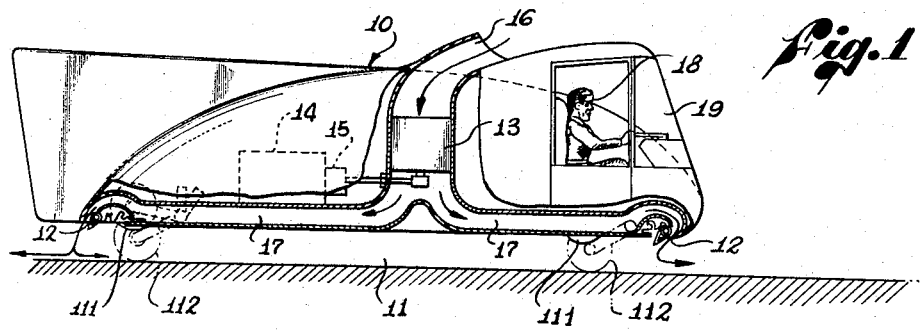
Fig. 1
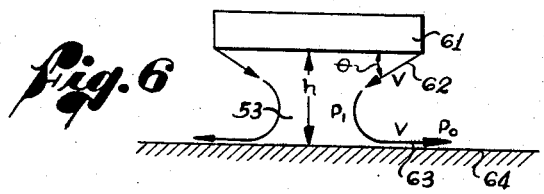
Fig. 6
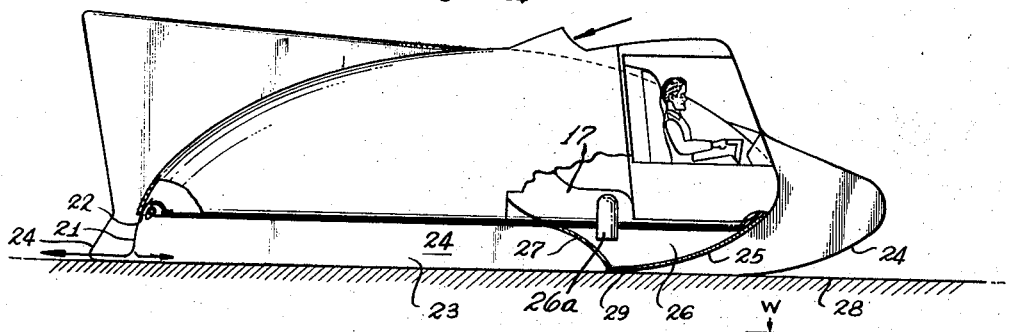
Fig. 2
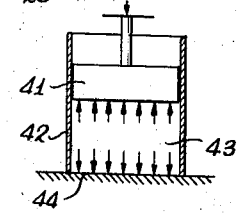
Fig. 4
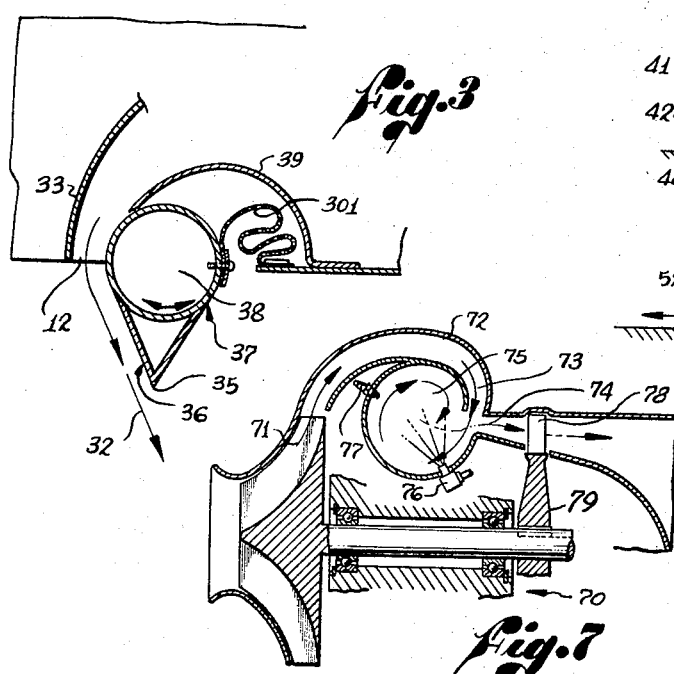
Fig. 3
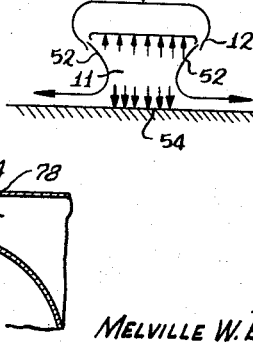
Fig. 5
Fig. 7
INVENTOR.
MELVILLE W. BEARDSLEY
BY Fulwider Mattingly & Huntley
Attorneys Sept. 19, 1967   M. W. BEARDSLEY   3,342,280
JET SHEET ENCLOSURE FOR COMPRESSED GASES
Filed April 4, 1957   2 Sheets-Sheet 2

INVENTOR.
MELVILLE W. BEARDSLEY
BY
Attorneys

United States Patent Office 3,342,280
Patented Sept. 19, 1967

3,342,280
JET SHEET ENCLOSURE FOR
COMPRESSED GASES
Melville W. Beardsley, Severna Park, Md., assignor, by mesne assignments, to Hovercraft Development Limited, London, England, a British company
Filed Apr. 4, 1957, Ser. No. 650,583
3 Claims. (Cl. 180—7)

The present invention relates generally to aerodynamics, and more particularly to a method and means for employing a sheet or ribbon-like jet of fluid as a confining enclosure for a body of compressed air or gas. The invention is useful in a variety of different applications and by way of example two embodiments are shown; one a land vehicle adapted to travel on a cushion of compressed air, and the other a combustion chamber for a gas turbine.

The first illustrative embodiment of my invention is a type of vehicle which can travel unrestrained over almost any type of terrain without benefit of roads, tracks, or other type of ground preparation. It is supported by a cushion of air, but it is not an airplane in the normal sense.

In many types of operations in remote areas there are no roads so that travel must be by foot or by the use of animals. Such travel is slow and only light loads can be carried. This is a costly handicap to such operations as prospecting for ore or minerals, particularly in arctic and sub-arctic regions where there is the additional problem of keeping roads clear of snow for a substantial portion of the year. In arctic regions where water transportation can be employed for some months of the year, shipping is impossible during a large part of the year because of heavy ice.

Aircraft are widely used for the transportation of personnel and comparatively light cargo loads to remote regions, but the operation of aircraft to transport heavy loads or comparatively low unit-value materials is uneconomical. In addition, airplanes require cleared airports with solid ground or prepared runways to begin and terminate their flights. The preparation of airports and/or runways is expensive, and they must be somewhat removed from buildings, such as mine shafts, smelters, oil derricks, refineries, factories, and the like. Since airplanes cannot be ground operated away from the airport, it is necessary to provide intermediate ground transportation and, as a result, expensive multiple loading and unloading operations are required.

Bearing in mind the above-noted and similar examples of conditions which make it difficult or impossible to operate conventional types of transportation, it is a major object of my invention to provide a vehicle which can travel freely over nearly any type of terrrain without the need for roadways, tracks, or other ground preparation.

Another object of my invention is to provide a vehicle which, in addition to having the ability to traverse nearly all types of terrain, does not require any special site or facilities, such as airport runways, to commence or terminate its journay and can also be driven on highways, city streets, and in and out of buildings, like an automobile or truck.

A further object of my invention is to provide a vehicle with the ability to hover close to the surface of the terrain with the use of less power and fuel consumption than can be attained with conventional VTO (Vertical Take Off) aircraft of the same weight.

The second illustration of my invention is in a valve means for a gas turbine.

As is well known in the art, internal combustion engines utilizing constant-volume combustion are in general more efficient than those utilizing constant-pressure combustion. In spite of the higher efficiency of constant-volume combustion, however, conventional gas turbines operate on the constant-pressure combustion principle. This has been due to the fact that constant-volume operation requires mechanical valving at the inlet and outlet of the combustion chamber and the problems inherent in such valving mechanisms outweigh the advantages of constant volume combustion.

By utilizing entirely aerodynamic means to control the combustion chamber pressures, the advantages of constant-volume combustion can be achieved without the hitherto unavoidable disadvantages of mechanical valves.

Bearing in mind the foregoing, it is an object of my invention in its second embodiment to provide entirely non-mechanical valve means for a gas turbine combustion chamber.

It is another object of the second embodiment of my invention to combine the valve means described with means for charging the combustion chamber with compressed air.

It is a still further object of the second embodiment to provide valve means of the character described which is adapted to automatically release the ignited mixture through the turbine when a predetermined combustion chamber pressure is reached.

The foregoing and additional objects and advantages of the invention will be apparent from consideration of the following detailed description, consideration being given also to the accompanying drawings in which:

FIGURE 1 is the first embodiment of my invention, being an elevational longitudinal section and layout of the major functional parts of one vehicle configuration;

FIGURE 2 is an elevational view partially sectioned of the layout of the major functional parts of another vehicle configuration of the first embodiment;

FIGURE 3 is an enlarged sectional view of a nozzzle discharge slot employed in the vehicles of FIGURES 1 and 2 and means for controlling the angle of ejection of the jet sheet ejected therethrough;

Figure 8:
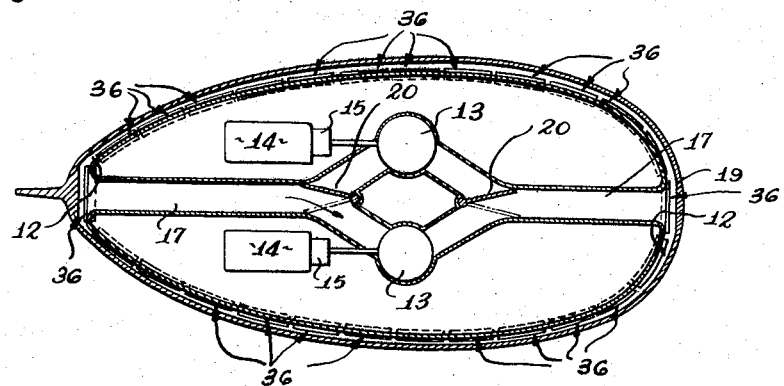
Figure 9:
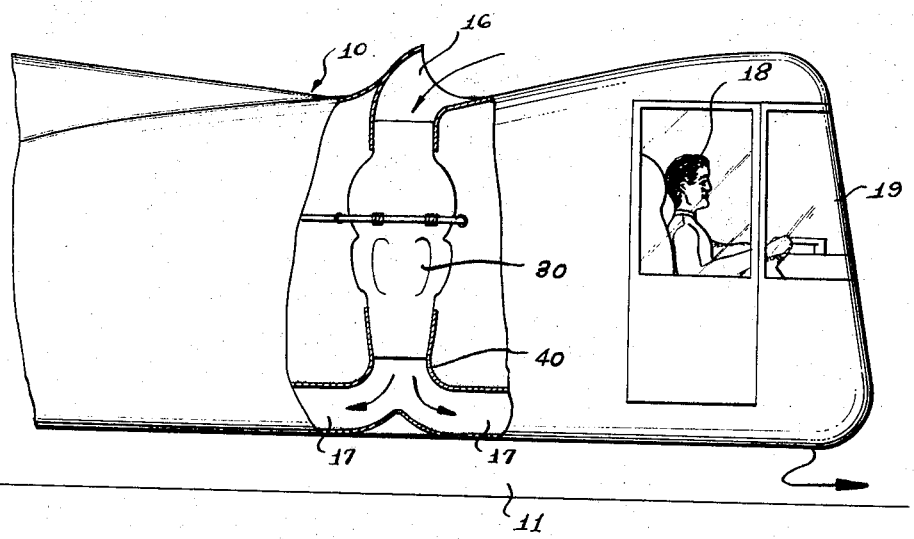

FIGURES 4, 5, and 6 are diagrammatic sketches illustrating the principles employed in the first embodiment of my invention;

FIGURE 7 is an axial section of the second embodiment of my invention in a gas turbine combustion chamber;

FIGURE 8 is a semi-schematic horizontal section of a vehicle embodying a dual-engine modification of the invention; and FIGURE 9 is an elevational sectional similar to FIGURE 1 but showing a modified engine-compressor.

Before proceeding with a description of the vehicle embodying this invention, the principles of operation will be described briefly as follows: Consider FIGURE 4, which represents a frictionless piston 41 free to move in vertical cylinder 42, but closely fitted so that a gas-filled space 43 is sealed beneath the piston 41 and above the fixed cylinder end 44. If a weight W is placed on top of the piston 41, it will assume an equilibrium position at which the weight W, plus the weight of the piston 41, are supported by an equal force created by the increased pressure of the gas in the space 43 acting upward on the surface area of the piston 41. Provided there is no leakage, the piston 41 will support the weight W and remain in this position above the closed cylinder end 44 without requiring the application of any power or energy.

The first embodiment of my invention pertains to means of supporting a vehicle in the same general manner, namely, by generating and containing a higher-than-atmospheric pressure in a space below a vehicle so that the vehicle is supported above the ground surface by the force of the increased pressure acting upward on the bottom surface of the vehicle.

Making an analogy to the piston-cylinder example shown in FIGURE 4, the vehicle takes the place of the piston 41 and the ground is the closed cylinder end 44. For a vehicle which will operate over rough natural terrain, it is obviously impractical to expect that a mechanical wall, similar to the cylinder wall 42 can be made to conform closely to the ground surface so as to effect a seal that will contain air at increased pressure in the space between the bottom of the vehicle and the ground. To satisfactorily accomplish its necessary sealing function, the vertical enclosing wall must be very flexible and resilient in order to conform with the varying ground surface over which the vehicle may travel.

To perform this pressure containing and sealing function, my invention employs a jet sheet of high-velocity gas, discharged downwardly and inwardly from a continuous nozzle slot around the lower periphery of the vehicle. A jet sheet of air acts like thin, stretched membrane and it can thus be used as a flexible pressure retaining wall. It is readily apparent that the jet sheet impinging on the ground surface will closely conform to the character of the surface. The difference in pressure across the jet sheet is maintained and balanced out by the change of flow direction of the jet sheet.

Referring to FIGURE 5, the vehicle is shown schematically at 10 carrying a load W. A jet sheet 52 is ejected from a nozzle slot 12 continuously around the lower periphery of the vehicle with a downward and inward direction. A region of increased pressure 11 is developed and maintained by the surrounding jet sheet 52, and due to this increased pressure, the jet sheet is deflected outwardly as it progresses after leaving the nozzle slot 53. Upon impinging on the ground surface 54, the jet sheet assumes a generally horizontal flow outwardly from the surface area directly under the vehicle.

For an explanation of this phenomenon and the relationship of the prime variables involved, consider FIGURE 6 wherein the principal is shown as supporting a weight 61. The vector $v$, 62 represents the velocity of the jet sheet ejected downwardly from the weight 61 through a nozzle slot at an angle $\theta$ with the horizontal. The vector $v$ 63, having the same magnitude as 62, represents the velocity of the jet sheet, assuming no friction for this ideal case, after its contact with the ground surface 64. The height of the jet discharge above the ground surface 64 is represented by dimension $h$.

Considering a horizontal balance of forces on the jet sheet, the pressure differential on opposite sides of the sheet is balanced by the change of horizontal momentum of the jet sheet. In equation form, for a unit width of jet nozzle or jet sheet:

$$(p_1 - p_0)h = ptv(v \cos \theta + v)$$
$$= pt(\cos \theta + 1)v^2$$

where $t$ is the thickness of the jet sheet and $p$ is the density of the gas in the jet. Although the jet sheet velocity is reduced by mixing effects along its path after discharge, I have determined experimentally that the above equation gives the proper relationship of the prime variables.

The space, e.g., 53, containing increased pressure is generated and maintained solely by the surrounding jet sheet.

The preceding explanation applies to the static, or hovering, condition of the vehicle and is given to explain the basic operating principle of my invention. In actual practice, when the vehicle is moving additional lift will be developed due to the aerodynamic flow over the body similar to that over an airfoil, or airplane wing. As the forward speed increases the aerodynamic forces due to the moving through the air become greater, so that the jet sheet can be ejected with a rearward component and serve essentially to supply thrust as does a jet engine.

FIGURE 1 shows a schematic layout of the vehicle, again indicated generally by the reference character 10. The illustration shows the vehicle 10 a short distance above the ground supported largely by the above-atmospheric pressure in the space 11 between the vehicle and the ground; the space 11 being surrounded by the continuous jet sheet ejected from the jet nozzle slots 12 around the periphery of the vehicle. Some support, or lift, is also supplied by the downward momentum imparted to the air ejected from the nozzles 12.

The air issuing from the nozzle slots 12 is impelled by a compressor-blower 13 driven by an engine 14 through a suitable power transmission 15. The air enters through an inlet passage 16 into the compressor-blower 13 from which it is conducted by suitable conduits 17 to the jet nozzle slots 12. An operator 18 is shown in an enclosed compartment 19.

Wheels 111 which may be employed for supporting the vehicle when it is driven over roads or smooth surfaces, are shown in a retracted position. The positions of the wheels, when extended for use, are indicated in phantom line at 112.

In the interest of clarity, the layout schematically shown in FIGURE 1 is in its most simplified form. In actual practice more than one engine may be installed for reasons of safety. There may also be more than one compressor-blower 13 as shown in FIGURE 8 with associated valving means such as the flap valves 20 to prevent back-flow in case one is inoperative. For some installations it may also be found desirable to provide the jet-sheet flow directly by the exhaust of turbo-jet or by-pass gas turbine engines. Such an arrangement is shown in FIGURE 9 wherein a conventional gas turbine engine 30 is mounted to discharge directly through a heat resistant conduit 40 into the nozzle slots 12. These, and other flow producing devices may also be employed in various combinations within the concept of my invention.

One or more of the wheels 111, 112 may, if desired, be power driven by a suitable power transmission system connected to the engine 14, or by a separate engine installed for this purpose.

FIGURE 2 illustrates another configuration of a vehicle employing the first embodiment of my invention. This second configuration is adapted especially for operation over snow, ice, water, or mud. The jet sheet 21 is generated by the same type of power plant as shown in FIGURE 1, but the jet sheet 21 is ejected only through a nozzle slot 22 extending across the rear of the vehicle. The jet sheet 21 generates a greater-than-atmospheric pressure under the vehicle in the space 23 which is sealed on the right and left sides by walls 24 projecting downward at each side below the bottom of the vehicle, and at the front by a flexible sheet 25. The jet sheet 21 seals the rear of the space.

The side-sealing walls 24 are analogous to sled runners and would actually operate in a similar fashion when the vehicle is traversing snow, ice, or mud, although their vertical loading would be much less, since their function is to effect a surface seal between the pressurized space 23 below the vehicle and the outside atmosphere.

The means for sealing the front of the pressurized space 23 is, in this illustration, a flexible sheet 25 such as plastic. In this illustration it is shown held in sealing position against the ground surface 28 by means of pneumatic pressure in compartment 26 enclosed at its bottom rear by a flexible membrane 27. The flexible sheet 25 is flexibly joined with a runner wall 24 at each side so as to effect a continuous seal along the front of the pressurized space 23. The compartment 26 is pressurized by a direct connection 26a to the duct 17 which conducts the energized gas to a jet nozzle-slot 22. Some hard, long wearing material, strips or sheet 29 may be fixed to the lower edge of the flexible sheet 25 to prevent wear due to abrasion. Retractable wheels may also be incorporated in a manner similar to that discussed in connection with FIGURE 1.

When partially supported by the ground, as shown in the configuration indicated in FIGURE 2, the vehicles will be more economical in operation because the more effective sealing of the mechanical contact of the sealing member at the front 25 and two sides 24 makes possible the generation of the same pressure in the space 23 with the use of substantially less gas flow. This means that operation close to the ground surface can be accomplished with less expenditure of power and fuel.

FIGURE 3 illustrates means for controlling the direction of jet sheet flow from the jet nozzle slot 12 or 22 of the above described vehicles. The desired path of the jet sheet ejected from the nozzle slot 12 is indicated by symbol 32.

I make use of the so-called "Coanda" effect to regulate the direction of discharge of the jet sheet. The Coanda effect is the tendency of a moving fluid to follow the direction of a surface over which it flows. Due to this tendency as applied in the instant case, the jet sheet 12 adheres to, and flows along, the flat portion 36 of a hollow control rod 37, so that the rotation of the rod 37 about its axis 38 determines the direction of flow of the jet sheet. Since the downstream edge 35 of the control rod 37 is formed with a relatively sharp angle, the flow cannot turn to follow the surface and, hence, continues along the direction 32 given by the position of the flat surface 36.

The jet nozzle slot 12 is the space between a formed sheet 33 and the adjacent opposite surfaces of the control rod 37. A formed baffle guide sheet 39 is provided to give a smooth guide surface to the flow entering the jet nozzle slot 12, and a flexible sealing sheet 301 is incorporated to prevent flow over the back of the control rod 37.

The second embodiment of my invention is, in general, a means for generating and maintaining pressure in a combustion chamber having an opening in its wall. This is done by ejecting a high-velocity jet sheet across the opening with a component of velocity perpendicular to the axis of the opening.

The present invention is useful in what I have termed a "quasi-constant volume" turbine. The term "quasi-constant volume" as used herein refers to a type of gas burning turbine which has some of the characteristics of a constant volume internal combustion engine and some of the characteristics of a constant pressure type engine.

In a strictly constant volume type of engine the burning gases are confined by some valving means in a containment of constant volume during substantially the entire burning period and then released to do work as, for example, by passing through a turbine. In such a device the gas pressure rises continuously during the burning period and the useful work is represented by the increase in pressure of a constant volume of gas.

In the constant pressure type of engine gas is continuously supplied to the work means, e.g., a turbine, at a constant pressure (the gas supply being the products of combustion) and the useful work is represented by the volume of gas delivered at the constant pressure.

In the present device the pressure in the constant volume combustion chamber is at first increased without releasing any work—being retained by the jet sheet across the exit of the chamber—until the pressure reaches a given value at which the sheet breaks releasing the pressurized combustion products to do work. After the jet sheet breaks, the device acts somewhat like a constant pressure turbine since work is being done by the combustion products during the combustion period.

By way of specific example of the second embodiment, the invention is shown incorporated in a quasi-constant-volume gas turbine 70, illustrated schematically in FIGURE 7. The induction air for the turbine 70 is compressed by a compressor 71 and pumped through a connecting duct 72 to a jet sheet nozzle 73. From the nozzle 73 the air is ejected across the turbine nozzle opening 74 into the combustion chamber 75 in which a circular flow pattern is established.

Due to the earlier-described membrane-like character of a jet sheet, the sheet of moving air from the nozzle 73 across the opening 74 prevents air in the chamber from escaping through the opening 74 and causes a rise in pressure within the chamber 75. In effect, the jet sheet acts as as valve.

At a proper time, determined by conventional timing means, fuel is injected through an injector 76 to mix with the compressed air in the chamber 74 and the fuel-air mixture is ignited by glow-plug or spark-plug 77.

As the pressure rises due to combustion, a pressure is finally reached that can no longer be contained by the jet-sheet valve and the chamber 75 discharges through the opening 74 causing the discharged gas to impinge on the buckets 78 of the turbine wheel 79.

When, due to the inertia of the rapidly discharging products of combustion, the pressure in the combustion chamber 75 falls below the compressor discharge pressure, compressed air is again discharged through the jet-sheet nozzle 73 into the combustion chamber and the cycle is repeated.

The flow of the jet-sheet across the turbine nozzle opening 74 functions as a valve to prevent flow out of the combustion chamber through the turbine nozzle opening 74 until the pressure in the combustion chamber rises to a value having a predetermined relation to the total pressure of the flow in the jet-sheet. In this way mechanical valves are eliminated and the more efficient constant-volume combustion is achieved.

While the forms of the invention shown and described herein are fully capable of achieving the objects and providing the advantages hereinbefore stated, it will be realized that they are capable of considerable modification without departure from the spirit of the invention. For this reason I do not mean to be limited to the forms shown and described, but rather to the scope of the appended claims.

I claim:

1. A ground effect vehicle for travel over and in close proximity to a surface, comprising: a body having its bottom adapted to be vertically spaced above said surface and having a sufficient portion to be acted upon by underlying fluid pressure so that the weight of the vehicle may be sustained, means on said body to sealingly and laterally circumscribe a space between said surface and said bottom portion, said means including a jet nozzle having an orifice sized and shaped to establish a relatively thin jet sheet; said jet nozzle being positioned in a manner to direct the jet sheet downwardly towards said surface and, in issuing from said nozzle with inclination toward the center of the circumscribed space; means on said body for supplying pressurized fluid to said jet nozzle; and means for varying the inclination of at least a portion of said jet sheet relative to said circumscribed space, including a control member rotatably adjustable about an axis parallel to a portion of the jet nozzle and having a surface forming a downward extension of the inner wall of said nozzle along which the jet flows and to which it adheres due to the Coanda effect, the lower edge of said control member being so formed that the jet sheet leaves said member in the direction imparted thereto by said surface of said member.

2. A ground effect vehicle for travel over and in close proximity to a surface, comprising: a body having its bottom adapted to be vertically spaced above said surface and having a sufficient portion to be acted upon by underlying fluid pressure so that the weight of the vehicle may be sustained, means on said body to sealingly and laterally circumscribe a space between said surface and said bottom portion, said means including a jet nozzle having an orifice sized and shaped to establish a relatively thin jet sheet; said jet nozzle being positioned in a manner to direct the jet sheet downwardly towards said surface and, in issuing from said nozzle, with inclination toward the center of the circumscribed space; shiftable means associated with the nozzle adapted to vary the degree of such inclination; and means on said body for supplying pressurized fluid to said jet nozzle; said shiftable means including a control member rotatably adjustable about an axis parallel to the jet nozzle and having a surface extending below said nozzle orifice along which the jet flows and to which it adheres due to the Coanda effect, the lower edge of said control member being formed with a relatively sharp angle so that the jet sheet leaves said member in the direction imparted thereto by said surface of said member.

3. A ground effect vehicle for travel over and in close proximity to a surface, comprising: a body having its bottom adapted to be vertically spaced above said surface and having a sufficient portion to be acted upon by underlying fluid pressure so that the weight of the vehicle may be sustained; means on said body to sealingly and laterally bound a space between said surface and said bottom portion; said means including side walls, a flexible end wall interconnecting said side walls at one end of the vehicle, said side walls and end wall depending from the periphery of said bottom portion, and a jet nozzle positioned and dimensioned to direct a relatively thin jet sheet of fluid issuing from said nozzle downwardly toward said surface and with inward inclination relative to said space; means on said body for supplying pressurized fluid to said jet nozzle; and means for varying the degree of such inclination, including a control member rotatably adjustable about an axis parallel to the jet nozzle and having a surface extending below said nozzle along which the jet sheet flows and to which it adheres due to the Coanda effect, whereby rotation of said control member about its axis varies the direction in which the jet sheet leaves said member.

References Cited

UNITED STATES PATENTS

| | | |
|---|---|---|
| 978,916 | 12/1910 | Matchette _____ 15—405 X |
| 989,834 | 4/1911 | Clark. |
| 1,123,589 | 1/1915 | Porter. |
| 1,294,834 | 2/1919 | Rothweiler _____ 60—39.76 |
| 1,505,914 | 8/1924 | Witteborg _____ 98—36 |
| 1,621,625 | 3/1927 | Casey. |
| 1,657,066 | 1/1928 | Burke _____ 98—36 X |
| 1,698,482 | 1/1929 | Nicin _____ 180—7 |
| 1,720,939 | 7/1929 | Wilkin _____ 244—23 |
| 1,775,757 | 9/1930 | Gay _____ 180—1 X |
| 1,838,354 | 12/1931 | Bauer _____ 244—23 |
| 1,924,719 | 8/1933 | Holzwarth _____ 60—39.76 |
| 2,008,464 | 7/1935 | Nishi _____ 244—23 |
| 2,218,938 | 10/1940 | Rinne. |
| 2,322,790 | 6/1943 | Cristadoro. |
| 2,444,318 | 6/1948 | Warner. |
| 2,461,435 | 2/1949 | Neumann et al. _____ 244—23 |
| 2,567,392 | 9/1951 | Naught. |
| 2,780,826 | 2/1957 | Coons et al. _____ 280—12 X |
| 2,838,257 | 6/1958 | Wibault. |
| 2,863,373 | 12/1958 | Steiner _____ 98—36 |
| 2,922,277 | 1/1960 | Bertin. |

OTHER REFERENCES

Publication, "Flight," Feb. 4, 1955; pp. 134 and 135.
Publication, "Aviation Week," Apr. 25, 1955; pp. 44 and 47.

A. HARRY LEVY, *Primary Examiner.*

WILLIAM KANOFF, GEORGE HYMAN, JR., PHILLIP ARNOLD, *Examiners.*